March 16, 1926.
R. J. WILLIAMS
PIPE CONNECTION
Filed June 22, 1921
1,576,698
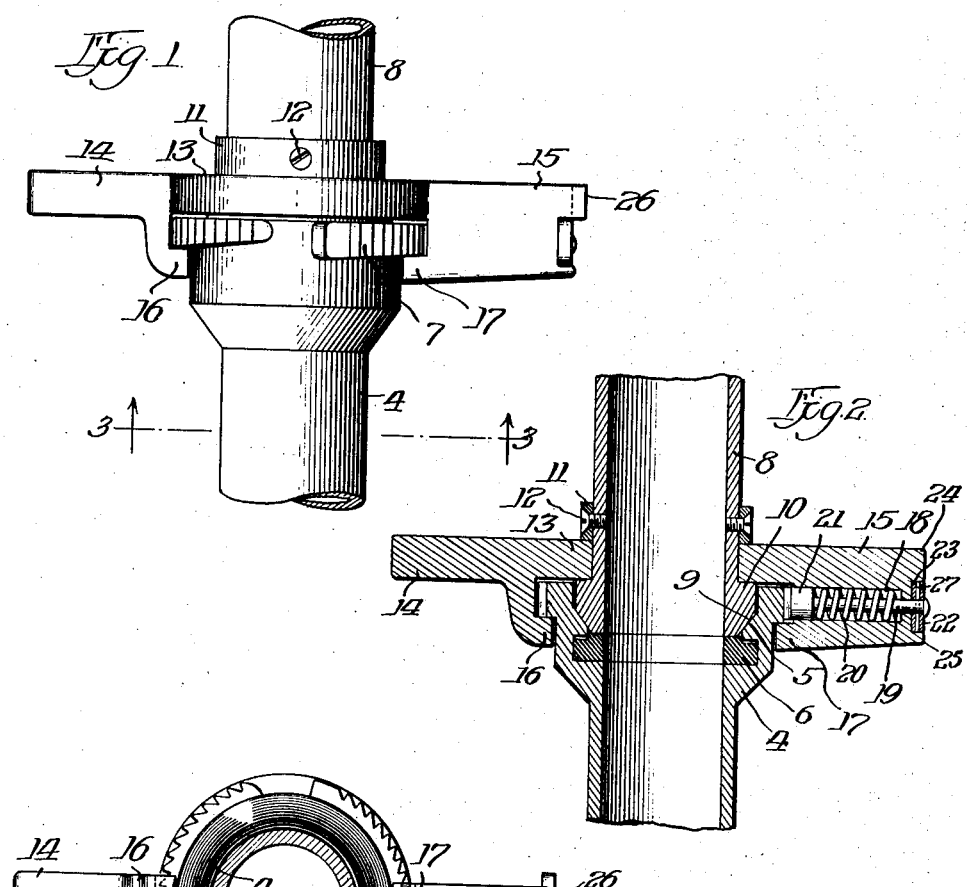
Inventor
Richard J. Williams,
By D. Anthony Usina
Atty Patented Mar. 16, 1926.

1,576,698

UNITED STATES PATENT OFFICE.

RICHARD J. WILLIAMS, OF VIRGINIA, MINNESOTA.

PIPE CONNECTION.

Application filed June 22, 1921. Serial No. 479,549.

*To all whom it may concern:*

Be it known that I, RICHARD J. WILLIAMS, a citizen of the United States, residing at Virginia, in the county of St. Louis and State of Minnesota, have invented certain new and useful Improvements in Pipe Connections, of which the following is a specification.

This invention relates to a new and improved pipe connection, and more particularly to such a connection which secures a fluid-tight joint and which may be readily and easily connected or disconnected.

Connections of this character are particularly useful in a number of applications, such for example as connecting heavy water-hose to water tanks of locomotives or steam shovels. In such uses the connection must be capable of standing up under heavy service conditions and being easily manipulated. The connection further must be fully water-tight.

It is an object of the present invention to provide a pipe or hose connection of the character described which is adapted to positively connect two pipe or hose sections; which may be readily operated; and which is capable of automatically locking itself in engaged position.

It is a further object to provide a device which is simple in design and rugged in construction and which is capable of withstanding hard usage.

Other and further objects will appear as the description proceeds.

The present invention is in the nature of an improvement over my prior application Serial No. 456,451, filed March 28, 1921. In the present device a socket member is provided with a plurality of circumferentially extending cam shoulders and a second member is provided with a rotatable collar having lugs adapted to engage under the cam shoulders. One of the lugs carries a spring pressed foot adapted to engage serrations upon a face of the shoulder to maintain the parts locked against rotation. The socket member is provided with a metallic cone-shaped seating face and with a compressible washer. The second member is provided with a cone face adapted to engage the cone seat in the socket member. Thus a metal-to-metal contact is made and the joint is further protected by the compressible gasket or washer.

I have illustrated a preferred embodiment of my invention in the accompanying drawings, in which—

Figure 1 is an elevation showing the device;

Figure 2 is a vertical section of Figure 1; and

Figure 3 is a view taken on line 3—3 of Figure 1.

As best shown in Figure 2, the socket member 4 is provided with the cone seat 5 and carries inwardly of that seat the washer or gasket 6. As best shown in Figure 1, the outer face of the socket member is provided with the circumferential cam shoulders 7. As shown, the outer faces of these shoulders are serrated. The second member 8 is provided with the cone face 9 and the shoulder 10. Spaced from the shoulder 10 is the sleeve 11 which is held in place by screws 12. The collar 13 is rotatably carried upon the second member between the shoulder 10 and sleeve 11. This collar 13 is provided with oppositely extending operating arms 14 and 15, these arms being provided with the lugs 16 and 17 respectively, adapted to engage under the cam shoulders 7.

As best shown in Figure 2, the operating arm 15 is provided with the cavity 18 which contains the plunger 19 urged inwardly by the spring 20 pressing against the foot 21 of the plunger. The plunger extends through the outer end of the operating arm 15 and passes through the rotatable head 22, being secured to the head by the pin 27. When, as shown in the figures, the head 22 is in its transverse position, it fits in the socket 23. When rotated to the vertical position its ends rest upon the portions 24 and 25 of the outer face of the arm 15. The portion 24 is provided with a lug 26 adapted to limit the rotation of the head 22.

In assembling the two sections of the pipe connection, the collar 13 is so turned that the lugs 16 and 17 pass between the adjacent ends of the cam shoulders 7. The collar 13 is then rotated by means of the operating arms 14 and 15 in the counter clockwise direction, as seen in Figure 3. The lugs 16 and 17 coact with the lower cam faces of the shoulder 7 to draw the metallic cone surfaces 5 and 9 into intimate contact. The washer 6 is somewhat compressed by this action.

The spring pressed foot 21 passes freely over the serrations on the shoulders 7, due to their inclination, since the locking motion is in the counter clockwise direction. This foot, however, engages the serrations to automatically prevent unlocking motion in the reverse direction.

In order to unlock the coupling the rotatable head 22 is drawn outwardly against the pressure of the spring 20 and is rotated through 90 degrees until it rests upon the portions 24 and 25 and brings up against the lug 26. The teeth on the foot 21 are now out of engagement with the serrations on the shoulders 7 and the collar 13 may be readily rotated to unlock the two parts.

My coupling is composed of but few parts which are rugged in construction and it may be readily manufactured at comparatively low cost. It is simple and effective in its operation and affords a positively locking water-tight connection.

I claim:

In a pipe connection, an enlarged socket member having a seat formed therein, a plurality of circumferentially extending cam shoulders upon the outer face of said socket member, a second member having a shouldered head adapted to fit within said socket member, a collar fitted upon said head behind the shoulder, operating arms carried by the collar, lugs extending from the collar having portions adapted to engage under the cam shoulders of the socket member, serrations on the outer faces of the cam shoulders, a spring pressed plunger carried by the collar and having a foot adapted to engage the serrations to prevent relative rotation between the socket member and the collar, said plunger having a rotatable head, and a shoulder adjacent the head adapted to normally lock the head against rotation and to receive the head when withdrawn and rotated and retain it in withdrawn position with the foot out of engagement with the serrations.

Signed at Virginia, Minnesota, this 14th day of June, 1921.

RICHARD J. WILLIAMS.